US012609854B2

(12) United States Patent
Bian et al.

(10) Patent No.: US 12,609,854 B2
(45) Date of Patent: Apr. 21, 2026

(54) INFORMATION TRANSMISSION METHOD AND APPARATUS, AND FIRST COMMUNICATION NODE AND SECOND COMMUNICATION NODE

(71) Applicant: ZTE CORPORATION, Shenzhen (CN)

(72) Inventors: Luanjian Bian, Shenzhen (CN); Bo Dai, Shenzhen (CN); Youjun Hu, Shenzhen (CN); Kun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 136 days.

(21) Appl. No.: 18/682,380

(22) PCT Filed: Jun. 7, 2022

(86) PCT No.: PCT/CN2022/097297
§ 371 (c)(1),
(2) Date: Feb. 8, 2024

(87) PCT Pub. No.: WO2023/024641
PCT Pub. Date: Mar. 2, 2023

(65) Prior Publication Data
US 2025/0007763 A1      Jan. 2, 2025

(30) Foreign Application Priority Data
Aug. 25, 2021    (CN) .......................... 202110984136.0

(51) Int. Cl.
H04L 27/26        (2006.01)
H04L 5/00         (2006.01)
H04W 72/0446      (2023.01)

(52) U.S. Cl.
CPC ........ *H04L 27/2613* (2013.01); *H04L 5/0016* (2013.01); *H04L 5/0053* (2013.01); *H04W 72/0446* (2013.01)

(58) Field of Classification Search
CPC . H04L 27/2613; H04L 5/0016; H04L 5/0053; H04W 72/0446; H04W 4/20;
(Continued)

(56) References Cited

U.S. PATENT DOCUMENTS 5,953,326 A      9/1999  Nakamura et al.
7,173,919 B1 *   2/2007  Dabak .................... H04B 1/707
                                                   370/335
(Continued)

FOREIGN PATENT DOCUMENTS

CN           1533203 A       9/2004
CN         101242210 A       8/2008
(Continued)

OTHER PUBLICATIONS

International Search Report and Written Opinion (with English translation) received in corresponding Application No. PCT/CN2022/097297, dated Aug. 26, 2022, 13 pages.
(Continued)

*Primary Examiner* — Emmanuel Bayard
(74) *Attorney, Agent, or Firm* — Dority & Manning, P.A.

(57) ABSTRACT

Provided in the embodiments of the present application are an information transmission method and apparatus, and a first communication node and a second communication node. The method comprises: receiving an extended pre-amble sequence based on a selected extended code and transmitted by a second communication node; determining a target extended code based on the extended preamble sequence, where the target extended code is an extended code selected by a single second communication node in an
(Continued)

extended code set; and transmitting indication information of the target extended code.

20 Claims, 3 Drawing Sheets

(58) Field of Classification Search
CPC ..... H04W 4/80; H04J 13/0003; H04J 13/004; H04J 2011/0009; H04J 2011/0013; H04J 2013/0081; H04J 2013/0085; H04J 13/107; H04B 7/216; G06K 17/00
USPC ................................. 375/142, 260, 262, 295
See application file for complete search history.

(56) References Cited

U.S. PATENT DOCUMENTS

| | | | |
|---|---|---|---|
| 2002/0071384 A1 | 6/2002 | Hall et al. | |
| 2007/0064665 A1 | 3/2007 | Zhang et al. | |
| 2007/0165567 A1* | 7/2007 | Tan ...................... | H04J 13/102 |
| | | | 370/329 |
| 2009/0125792 A1* | 5/2009 | Lakkis ............... | H04B 7/06952 |
| | | | 714/783 |
| 2010/0027592 A1* | 2/2010 | Arviv ................... | H04B 1/7075 |
| | | | 375/150 |
| 2011/0007844 A1 | 1/2011 | Park et al. | |
| 2014/0064338 A1* | 3/2014 | Yu ........................ | H04B 1/7113 |
| | | | 375/142 |
| 2014/0153554 A1* | 6/2014 | He ........................ | H04W 72/23 |
| | | | 370/336 |
| 2016/0223644 A1 | 8/2016 | Soga | |
| 2018/0145808 A1* | 5/2018 | Kim ..................... | H04W 16/28 |
| 2018/0191417 A1* | 7/2018 | Kim ..................... | H04B 7/0695 |

FOREIGN PATENT DOCUMENTS

| | | |
|---|---|---|
| EP | 1110422 B1 | 12/2005 |
| EP | 2245899 B1 | 12/2014 |
| JP | 2009177734 A | 8/2009 |

OTHER PUBLICATIONS

Final Report of 3GPP TSG RAN WG1 #106-e v3.0.0, Online Meeting, Oct. 11-19, 2021, 166 pages.
Extended European Search Report for corresponding Application No. EP 22859988.2, dated Jul. 14, 2025, 11 pages.

* cited by examiner

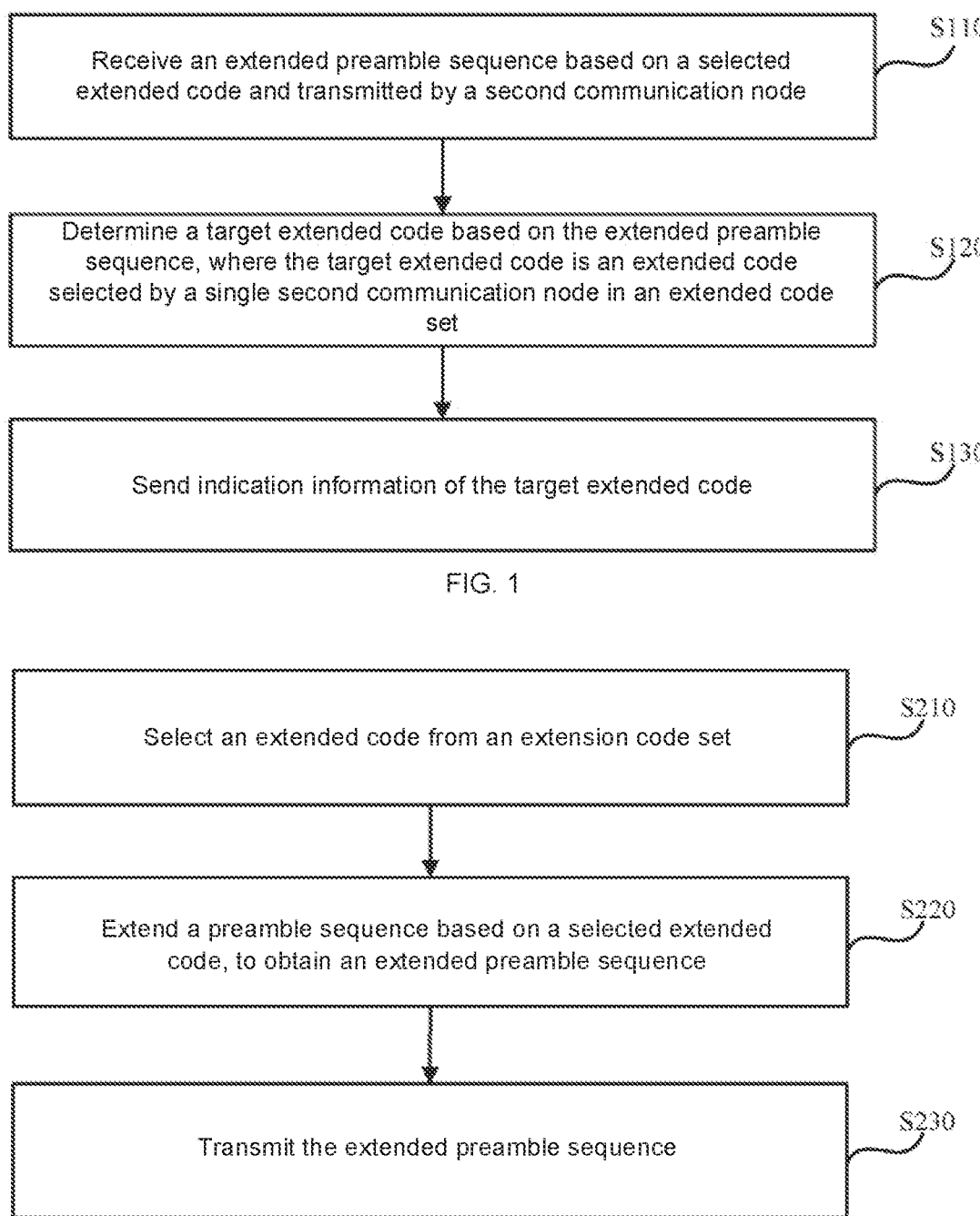

Receive an extended preamble sequence based on a selected extended code and transmitted by a second communication node —— S110

Determine a target extended code based on the extended preamble sequence, where the target extended code is an extended code selected by a single second communication node in an extended code set —— S120

Send indication information of the target extended code —— S130

FIG. 1

Select an extended code from an extension code set —— S210

Extend a preamble sequence based on a selected extended code, to obtain an extended preamble sequence —— S220

Transmit the extended preamble sequence —— S230

FIG. 2

INFORMATION TRANSMISSION METHOD AND APPARATUS, AND FIRST COMMUNICATION NODE AND SECOND COMMUNICATION NODE

CROSS-REFERENCE TO RELATED APPLICATION(S)

This application is a national phase entry under 35 USC 371 of International Patent Application No. PCT/CN2022/097297 filed on Jun. 7, 2022, the International Patent Application is filed based on Chinese Patent Application with the application No. 202110984136.0, filed on Aug. 25, 2021, and claims priority to the Chinese Patent Application, the entire contents of the International Patent Application and the Chinese Patent Application are incorporated herein by reference.

TECHNICAL FIELD

The present disclosure relates to the field of communication technology, and for example, relates to an information transmission method and apparatus, a first communication node and a second communication node.

BACKGROUND

In a passive radio frequency identification (RFID) related technology, a Q-selection algorithm is usually used to avoid collision of uplink signals between multiple electronic tags. However, there are problems of time domain resource waste and electronic tag response latency in the usage of the Q-selection algorithm.

Therefore, the problem of conflict of uplink signals is a technical problem that needs to be solved urgently at present.

SUMMARY

The present disclosure provides an information transmission method and apparatus, a first communication node, and a second communication node, thereby reducing the conflict between uplink signals.

In a first aspect, embodiments of the present disclosure provide an information transmission method, applied to a first communication node, the method includes:

receiving an extended preamble sequence based on a selected extended code and transmitted by a second communication node;

determining a target extended code based on the extended preamble sequence, where the target extended code is an extended code selected by a single second communication node in an extended code set; and transmitting indication information of the target extended code.

In a second aspect, the embodiments of the present disclosure provide an information transmission method, applied to a second communication node, the method includes:

selecting an extended code from an extended code set;

extending a preamble sequence based on the extended code that is selected, so as to obtain an extended preamble sequence; and transmitting the extended preamble sequence.

In a third aspect, the embodiments of the present disclosure provide an information transmission apparatus, configured for a first communication node, the apparatus includes:

a receiving module, configured to receive an extended preamble sequence based on a selected extended code and transmitted by a second communication node;

a determining module, configured to determine a target extended code based on the extended preamble sequence, where the target extended code is an extended code selected by a single second communication node in an extended code set; and a transmitting module, configured to transmit indication information of the target extended code.

In a fourth aspect, the embodiments of the present disclosure provide an information transmission apparatus, configured for a second communication node, the apparatus includes:

a selecting module, configured to select an extended code from an extended code set;

an extending module, configured to extend a preamble sequence based on the extended code that is selected, so as to obtain an extended preamble sequence; and a transmitting module, configured to transmit the extended preamble sequence.

In a fifth aspect, the embodiments of the present disclosure provide a first communication node, including:

one or more processors;

a storage means, configured to store one or more programs;

when the one or more programs are executed by the one or more processors, such that the one or more processors implement the information transmission method provided by the first aspect of the present disclosure.

In a sixth aspect, the embodiments of the present disclosure provide a second communication node, including:

one or more processors;

a storage means, configured to store one or more programs;

when the one or more programs are executed by the one or more processors, such that the one or more processors implement the information transmission method provided by the second aspect of the present disclosure.

In a seventh aspect, the embodiments of the present disclosure provide a storage medium, where the storage medium stores a computer program, the computer program, upon being executed by a processor, implements the information transmission method provided by the embodiments of the present disclosure.

Regarding the above embodiments and other aspects of the present disclosure and implementations thereof, more descriptions are provided in brief description of the drawings, detailed description and claims.

BRIEF DESCRIPTION OF THE DRAWINGS

FIG. 1 is a flow schematic diagram of an information transmission method provided by the embodiments of the present disclosure.

FIG. 2 is a flow schematic diagram of another information transmission method provided by the embodiments of the present disclosure.

DETAILED DESCRIPTION

Figure 3:
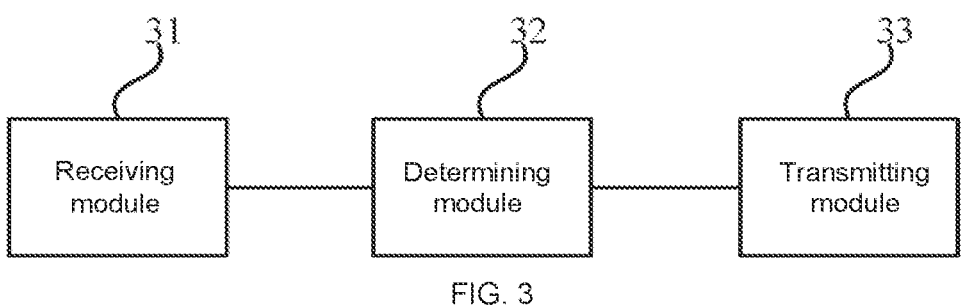
FIG. 3 is a structural schematic diagram of an information transmission apparatus provided by the embodiments of the present disclosure.

The embodiments of the present disclosure will be described in detail below in conjunction with the drawings. It should be noted that the embodiments and features in the embodiments in the present disclosure may be combined with each other arbitrarily without conflict.

Steps illustrated in the flowcharts of the drawings may be performed in a computer system containing such as a set of computer executable instructions. And, although a logical order is shown in the flowcharts, in some cases, the shown or described steps may be performed in an order different from the order herein.

In an exemplary implementation, FIG. 1 is a flow schematic diagram of an information transmission method provided by the embodiments of the present disclosure. The method may be applicable for avoiding the situation of the conflict of uplink signals, the method may be performed by an information transmission apparatus, the apparatus may be implemented by a software and/or a hardware and integrated on a first communication node.

In the passive RFID related technology, the Q-selection algorithm is usually used to avoid collision of uplink signals between multiple electronic tags. The Q-selection algorithm requires an electronic tag to randomly generate a response slot, and an uplink signal can only be transmitted when a slot counter of the tag is reduced to 0, which seriously increases a response latency of the electronic tag, and usually, there is a certain interval between slot values randomly obtained by different electronic tags, so there is a large amount of idle time that cannot be effectively used in uplink communication, resulting in a waste of resource. It is also possible that different tags randomly obtain the same response slot, resulting in the problem of uplink conflict still existing. Then, a reader needs to re-enable the Q-selection algorithm until uplink signals between all electronic tags no longer conflict, which further exacerbates the waste of time domain resources and the response latency of the electronic tags.

Code division multiplexing (CDM) can provide a parallel multichannel, which may assist multiple electronic tags to perform uplink signal transmission simultaneously. Normally, each tag uses an extended code with a guard period (GP) length, extended sequences between different tags are orthogonal to each other, so as to achieve the effect of code division multiplexing. If a frequency domain extended code is adopted, then the extended electronic tag data will occupy a bandwidth of a spread spectrum for Gp times, and multiple tags can be transmitted in parallel (Gp is a positive integer), which improves utilization efficiency of the spectrum. If a time domain extended code is adopted, then the extended electronic tag data is equivalently transmitted repeatedly in time domain, and the longer the extended code is, the higher the signal-to-noise ratio is, the better the coverage performance is, which is conducive to increasing a communication distance of a passive network.

Therefore, the present disclosure enables the code division multiplexing to be efficiently used in passive communication, and thus, the situation of conflict of uplink signals between different passive terminals is avoided, and simultaneously, the communication distance of the network may be also increased.

How to use code division multiplexing efficiently in passive communication is a problem to be studied and solved. As shown in FIG. 1, the embodiments of the present disclosure provide an information transmission method, including the following steps.

S110, receiving an extended preamble sequence based on a selected extended code and transmitted by a second communication node.

The first communication node in the present disclosure may be an uplink node of the second communication node. The second communication node includes a terminal device and a relay device, etc., which is not limited herein.

A number of the second communication nodes is one or more.

The selected extended code is an extended code selected from G extended codes, and is also referred to as an extended code selected from an extended code set, extended codes selected by each second communication node are the same or different. A second communication node, after selecting an extended code, extends a preamble sequence based on the extended code, so as to obtain the extended preamble sequence. Then, the extended preamble sequence is transmitted to the first communication node. The first communication node receives the extended preamble sequence transmitted by the second communication node, so as to determine whether the extended code selected by the second communication node conflicts.

The determination of the extended code set is not limited herein, extended code sets of the second communication nodes may be the same, and extended codes included in an extended code set are orthogonal to each other.

In an embodiment, the first communication node may determine a number of second communication nodes, and then, indicate each of the second communication nodes to select an extended code from G extended codes, where G is a positive integer greater than the number of the second communication nodes.

In order to avoid conflict of uplink signals of the second communication nodes, the first communication node may first determine the number of second communication nodes, and the means of the determination for the number of second communication nodes is not limited herein, e.g., the number of second communication nodes is determined based on received power of the preamble sequence.

After the number of second communication nodes is determined, the present disclosure may directly or indirectly indicate each of the second communication nodes to select an extended code from the G extended codes based on the number of second communication nodes. Herein, the direct indication may be of directly transmitting information of selecting an extended code from the G extended codes, so as to indicate each of the second communication nodes to select an extended code from the G extended codes. The indirect indication may be of indirectly indicating, through indication information, each of the second communication nodes to select an extended code from the G extended codes.

The first communication node determines a number G of extended codes according to a number N of second communication nodes. The first communication node then transmits indication information of the G extended codes; adopts the indication information of the G extended codes to indirectly indicate a second communication node to select an extended code from the G extended codes; where the indication information of the G extended codes includes a length or a number G of the extended codes.

S120, determining a target extended code based on the extended preamble sequence, where the target extended code is an extended code selected by a single second communication node in an extended code set.

According to this step, the extended preamble sequence may be de-extended, and the target extended code is determined according to power of a de-extended preamble sequence.

The target extended code is only selected by one second communication node.

S130, transmitting indication information of the target extended code.

According to this step, after the target extended code is determined, the indication information of the target extended code may be transmitted to each of the second communication nodes, so as to indicate each of the second communication nodes whether the selected extended code conflicts. For example, an extended code selected by a second communication node conflicts with an extended code selected by another second communication node. After each second communication node determines whether the selected extended code conflicts, the problem of conflict of uplink signals can be effectively avoided.

The indication information of the target extended code may be information indicating for each second communication node, an extended code selected by a single second communication, or an extended code which is not selected or selected by a plurality of second communication nodes. The information of the extended code (such as an extended code index) is not limited, as long as the information uniquely identifies the extended code.

According to the information transmission method provided by the embodiments of the present disclosure, the indication information of the target extended code is transmitted, so as to indicate for each second communication node, an extended code selected by a single second communication node or an extended code which is not selected or selected by a plurality of second communication nodes, such that the second communication node determines the situation of conflict of the selected extended codes, thereby enabling to efficiently avoid conflict of uplink signals.

Based on the above embodiments, variant embodiments of the above embodiments are proposed, and it should be noted herein that, in order to make the description brief, only differences from the above embodiments are described in the variant embodiments.

In an embodiment, determining a number of the second communication nodes, includes:

receiving a preamble sequence transmitted by the second communication nodes; and determining the number of the second communication nodes that simultaneously transmit the preamble sequence, according to received power of the preamble sequences.

In an embodiment, indicating each of the second communication nodes to select an extended code from the G extended codes, includes:

determining a number G of the extended codes according to the number of the second communication nodes, where G is greater than or equal to the number of the second communication nodes; and transmitting indication information of the G extended codes, where the indication information of the G extended codes indicates the number G of the extended codes or a length of the extended codes.

In an embodiment, determining the target extended code based on the extended preamble sequence, includes:

de-extending the extended preamble sequence with an extended code in the extended code set; and determining the target extended code according to power of a de-extended preamble sequence.

The extended codes in the present disclosure may be orthogonal to each other, so a preamble sequence may be not detected from extended codes which are not selected in the G extended codes, a preamble sequence with low power may be detected from the extended code selected by a single second communication node, and a preamble sequence with higher power may be detected from the extended code selected by the plurality of second communication nodes. Thus, according to the power of the de-extended preamble sequence, the first communication node determines which extended codes are selected by a single second communication node.

In an embodiment, the indication information of the target extended code indicates one or more of the following:

a first extended code subset, and a second extended code subset;

where the first extended code subset is a subset consisting of the target extended code in the extended code set, and the second extended code subset is a subset consisting of an extended code in the extended code set which is not selected, or which is selected by a plurality of second communication nodes.

In an embodiment, the indication information of the target extended code indirectly indicates that a second communicating node selecting the second extended code subset re-selects an extended code from the second extended code subset.

In an embodiment, the method further includes:

indicating the second communication node to transmit data extended based on the selected extended code.

After all the extended codes selected by the second communication node do not conflict, the first communication node may indicate the second communication node to transmit data extended based on the selected extended code.

The first communication node, after determining the target extended code, may transmit to the second communication node corresponding to the target extended code, an indication to indicate the second communication node to transmit the data extended based on the selected extended code.

In an embodiment, the method further includes:

receiving data extended based on the selected target extended code, where the data is transmitted by the second communication node.

A number of the target extended codes is at least one, and in a case where the number of the target extended codes are at least two, the second communication node selecting the target extended codes may be a second communication node selecting any one of the target extended codes.

In an embodiment, the method further includes:

receiving data according to a target slot, where the target slot is a slot corresponding to the target extended code. The received data is data transmitted on the target slot by the second communication node corresponding to the target extended code. An index of an extended code included in the first extended code subset may correspond to a slot value which characterizes the target slot.

In an embodiment, the method further includes:

acquiring data according to a target subcarrier, where the target subcarrier is a subcarrier corresponding to the target extended code. The acquired data is data transmitted on the target subcarrier by the second communication node corresponding to the target extended code. An index of an extended code included in the first extended code subset may correspond to the subcarrier.

In an example implementation, FIG. 2 is a flow schematic diagram of another information transmission method provided by the embodiments of the present disclosure. The method may be applicable for avoiding the situation of conflict of uplink signals, the method may be performed by an information transmission apparatus, the apparatus may be implemented by a software and/or a hardware and integrated on a second communication node.

As shown in FIG. 2, the information transmission method provided by the present disclosure includes the following steps.

S210, selecting an extended code from an extended code set.

According to this step, an extended code may randomly be selected from the extended code set.

The extended code set may be determined based on a number of extended codes, and the present disclosure may acquire indication information of the extended code set transmitted by a first communication node to determine the extended code set. The indication information of the extended code set may indicate a number G of extended codes within the extended code set. G extended codes in the extended code set belong to a pseudo-random sequence, or, the G extended codes are orthogonal to each other.

S220, extending a preamble sequence based on the extended code that is selected, so as to obtain an extended preamble sequence.

The extending means is not limited herein, and exemplarily, each element of the preamble sequence P is multiplied by an extended code K, so as to obtain the extended preamble sequence, also referred to as the preamble sequence after being extended.

S230, transmitting the extended preamble sequence.

According to this step, the extended preamble sequence may be transmitted to the first communication node, so as to determine an extended code selected by a single second communication node.

According to the information transmission method provided by the present disclosure, the extended preamble sequence is transmitted to the first communication node, for the first communication node to analyze an extended code selected by a single second communication node, and then, indicate whether the extended code selected by each second communication node conflicts, thereby effectively avoiding conflict of uplink signals.

In an embodiment, the method further includes:

receiving indication information of a target extended code, where the indication information of the target extended code indicates a first extended code subset or a second extended code subset;

where the first extended code subset is a subset consisting of an extended code which is selected by a single second communication node in the extended code set, and the second extended code subset is a subset consisting of an extended code in the extended code set which is not selected, or which is selected by a plurality of second communication nodes.

The indication information of the target extended code may indicate whether an extended code selected by the second communication node is in conflict with an extended code selected by the remaining second communication nodes.

In an embodiment, the method further includes:

in a case where the extended code that is selected belongs to a second extended code subset, re-selecting an extended code from the second extended code subset, and returning to perform an operation of extending the preamble sequence based on the extended code that is selected, until the extended code that is selected belongs to a first extended code subset.

The case where the extended code that is selected belongs to the second extended code subset may be considered that the extended code selected by the second communication node (also referred to as, the chosen extended code) is in conflict with the extended codes selected by the remaining second communication nodes, then the second communication node may re-select an extended code from the second extended code subset.

In an embodiment, the method further includes:

in a case where the extended code that is selected belongs to a first extended code subset, extending data based on the extended code that is selected, so as to obtain extended data; and transmitting the extended data.

In a case where the extended code that is selected belongs to the first extended code subset, it may be considered that the extended code selected by the second communication node is not in conflict with the extended codes selected by the remaining second communication nodes, then the second communication node may extend the data based on the extended code that is selected, so as to obtain the extended data.

In an embodiment, the method further includes:

determining a corresponding slot according to an index of the extended code that is selected; and transmitting data based on the slot.

In a case where the extended code that is selected belongs to the first extended code subset, the corresponding slot is determined according to an index of the extended code that is selected; and the data is transmitted based on the slot.

In an embodiment, the method further includes:

determining a corresponding subcarrier according to an index of the extended code that is selected;

mapping data onto the subcarrier and transmitting the data.

In a case where the extended code that is selected belongs to the first extended code subset, the corresponding subcarrier is determined according to an index of the extended code that is selected; and the data is mapped onto the subcarrier and transmitted.

The following is an exemplary description of the present disclosure, the information transmission method provided in the present disclosure may be considered as a code division multiplexing based collision prevention method. The method effectively avoids the situation of conflict of uplink signals through solutions provided by the following embodiments.

A code division multiplexing based collision prevention method, applied to a first communication node, includes:

1. Receiving an extended preamble sequence based on an extended code and transmitted by a second communication node. In this embodiment, the first communication node receives extended preamble sequences based on extended codes, where the extended preamble sequences are transmitted by N second communication nodes, N is greater than or equal to 1. Herein, each second communication node selects an extended code from an extended code set, and based on the selected extended code, extends the preamble sequence to obtain an extended preamble sequence. Herein, the extended preamble sequence includes at least one of: an extended preamble sequence, obtained by each element of the preamble sequence P being multiplied by the extended code K, i.e., $P^{\otimes}K$; or, an extended preamble sequence, obtained by the preamble sequence P being multiplied by each element of the extended code K, i.e., $K^{\otimes}P$. Herein, $^{\otimes}$ denotes kronecker product.

The second communication node transmits the extended preamble sequence; and the first communication node receives the extended preamble sequence transmitted by the second communication node.

In this embodiment, the preamble sequence is a fixed high and low level amplitude signal, or a bit sequence. The preamble sequence transmitted by each second communication node is the same.

In this embodiment, the extended code belongs to a pseudo-random sequence, or, extended codes in the extended code set are orthogonal to each other.

In this embodiment, before the first communication node receives the extended preamble sequence based on the extended code and transmitted by the second communication node, the first communication node may also perform the following operations:

1) determining a number N of second communication nodes. For example, the first communication node transmits a downlink command A, so as to indicate a second communication node to transmit an uplink response signal. The uplink response signal at least includes a preamble sequence (preamble). A second communication node under coverage of the first communication node, after receiving the downlink command A, transmits an uplink response signal, the preamble sequence in the uplink response signal is an original preamble sequence, which is not processed by the extended code. The first communication node receives a preamble sequence transmitted by a second communication node; determines a number N of the second communication nodes simultaneously transmitting the preamble sequence, according to received power of the preamble sequences;

where determining the number N of the second communication nodes simultaneously transmitting the preamble sequences, according to the received power of the preamble sequences, includes: in a case where a plurality of second communication nodes simultaneously transmit the uplink response signals, collision occurs between the uplink response signals, and since the preambles in the uplink response signals of all the second communication nodes are the same, the preamble received by the first communication node is a superposition of the preambles of the second communication nodes, and the first communication node may determine the number N of the second communication nodes simultaneously transmitting the uplink response signals based on the received power of the preamble;

2) informing each of the N second communication nodes to select an extended code from the extended code set. For example, the first communication node determines the extended code set according to the number N of second communication nodes. The first communication node transmits indication information of the extended code set, where the indication information of the extended code set indirectly indicates a second communication node to select an extended code from the extended code set. The second communication node receives the indication information of the extended code set, and then selects an extended code from the extended code set.

2. Determining a target extended code based on the extended preamble sequence, where the target extended code is an extended code selected by a single second communication node in the extended code set.

3. Transmitting indication information of the target extended code.

In this embodiment, the extended preamble sequence is de-extended with the extended code in the extended code set; and the target extended code is determined according to power of a de-extended preamble sequence.

For example, the first communication node de-extends the extended preamble sequence with each of extended codes in the extended code set in sequence. Since the extended codes are orthogonal to each other, preamble information can not be detected from an extended code which is not selected by the second communication node in the extended code set, preamble information with low power may be detected from a selected extended code by a single second communication node, and preamble information with higher power may be detected from a selected extended code by a plurality of second communication nodes. Thus, according to the power of the de-extended preamble, the first communication node can determine which extended codes are selected by a single second communication node.

At the same time, the first communication node may also determine which extended codes are repeatedly selected by a plurality of second communication nodes, i.e., there is a selection conflict of extended codes. If there is selection conflict of extended codes, i.e., a plurality of second communication nodes repeatedly select the same extended code, then the second communication nodes that have selected the same extended code will transmit data information based on the same extended code, which cannot achieve the effect of code division multiplexing, and since the data information between the plurality of second communication nodes is not the same, the first communication node cannot detect the data information of these second communication nodes. To this end, this embodiment provides four solutions.

Solution 1

The second communication nodes with selection conflict of extended codes re-select extended codes, until all the second communication nodes select different extended codes. Thus, the N second communication nodes can transmit data information in parallel based on respective extended codes thereof, thereby implementing code division multiplexing of signals.

For example, the first communication node transmits indication information of the target extended code, where the indication information of the target extended code indicates one or more of the following: a first extended code subset and a second extended code subset. Herein, the first extended code subset is a subset consisting of the target extended code in the extended code set, and the second extended code subset is a subset consisting of an extended code in the extended code set which is not selected or selected by a plurality of second communication nodes. The indication information of the target extended code indirectly indicates the second communication node selecting the second extended code subset to re-select an extended code from the second extended code subset.

For example, the first communication node transmits the indication information of the target extended code, the second communication node receives the indication information of the target extended code, and if the selected extended code belongs to the second extended code subset, then an extended code is re-selected from the second extended code subset. If the selected extended code belongs to the first extended code subset, then the selected extended code is retained, without re-selection. This is because: extended codes contained in the first extended code subset are all the extended codes selected by a single second communication node, and there is no selection conflict of extended codes, thus the extended codes in the first extended code subset may be used directly for the corresponding second communication node. Whereas, extended codes contained in the second extended code subset are extended codes which are not selected or selected by a plurality of second communication nodes, and if an extended code selected by the second communication node belongs to the second extended code subset, which indicates selection conflict of extended codes, then these conflicting second communication nodes need to re-select extended codes. Also because the extended codes of the first extended code subset have been allocated and adopted, the second communication node which has selected the extended code in the second extended code subset, can only re-select an extended code in the second extended code subset.

Return to the first communication node receiving the extended preamble sequence based on the selected extended code and transmitted by the second communication node, until all the second communication nodes select different extended codes.

The first communication node transmits a command C to notify the N second communication nodes to transmit data extended based on the extended codes. For example, any one of the N second communication nodes extends to-be-transmitted data based on selected extended code thereof, so as to obtain extended data, and transmits the extended data. Extending the to-be-transmitted data based on the selected extended code thereof, includes: multiplying each data of a to-be-transmitted data sequence S by an extended code K to obtain the extended data, i.e., $S^{\otimes}K$; or, multiplying a to-be-transmitted data sequence S by each element of an extended code K to obtain the extended data, i.e., $K^{\otimes}S$. Herein, $^{\otimes}$ denotes kronecker product.

Solution 2

The second communication nodes without selection conflict of extended codes, transmit data information in parallel based on the respective extended codes, thereby implementing the code division multiplexing of signals.

For example, the first communication node transmits the indication information of the target extended code, where the indication information of the target extended code indicates one or more of the following: a first extended code subset and a second extended code subset. Herein, the first extended code subset is a subset consisting of the target extended code in the extended code set, and the second extended code subset is a subset consisting of an extended code in the extended code set which is not selected or selected by a plurality of second communication nodes.

For example, the first communication node transmits the indication information of the target extended code, so as to indicate extended codes contained in the first extended code subset. Thus, the second communication node may determine whether the extended code selected by itself conflicts. The second communication nodes without selection conflict of extended codes extend to-be-transmitted data based on respective selected extended code thereof, so as to obtain extended data, and transmit the extended data.

Herein, extending the to-be-transmitted data based on the respective selected extended code thereof, includes: multiplying each data of a to-be-transmitted data sequence S by an extended code K, so as to obtain the extended data, i.e., $S^{\otimes}K$; or, multiplying a to-be-transmitted data sequence S by each element of an extended code K, so as to obtain the extended data, i.e., $K^{\otimes}S$. Herein, $^{\otimes}$ denotes kronecker product.

If a number of second communication nodes without selection conflict of extended codes is 0, i.e., extended codes selected by the N second communication nodes are all in conflict, then the first communication node re-notifies the N second communication nodes to select an extended code from the extended code set respectively.

Solution 3

The target extended code corresponds to a target slot. The second communication nodes without selection conflict of extended codes transmit data information based on slot values corresponding to the respective extended code indices, thereby implementing time division multiplexing of signals.

For example, the first communication node transmits indication information of the target extended code, where the indication information of the target extended code indicates one or more of the following: a first extended code subset and a second extended code subset. Herein, the first extended code subset is a subset consisting of the target extended code in the extended code set, and the second extended code subset is a subset consisting of an extended code in the extended code set which is not selected or selected by a plurality of second communication nodes.

For example, the first communication node transmits the indication information of the target extended code, so as to indicate extended codes contained in the first extended code subset, and each target extended code corresponds to a target slot. The second communication nodes without selection conflict of extended codes transmit data according to the target slot corresponding to the selected extended code.

Herein, transmitting the data according to the target slot corresponding to the selected extended code, includes: in a case where the slot value is S, transmitting the data when a slot counter of the second communication node is increased to S; or, in a case where the slot value is S, transmitting the data when a slot counter of the second communication node is decreased from S to 0.

The first communication node receives data according to the target slot, where the target slot is a slot corresponding to the target extended code.

Solution 4

The target extended code corresponds to a target subcarrier. The second communication nodes without selection conflict of extended codes, map data to a subcarrier corresponding to the selected extended code. Because the extended codes between these second communication nodes are different, the subcarriers used are different from each other, thereby implementing orthogonal frequency division multiplexing (OFDM) of signals of multiple second communication nodes.

For example, the first communication node transmits indication information of the target extended code, where the indication information of the target extended code indicates one or more of the following: a first extended code subset and a second extended code subset. Herein, the first extended code subset is a subset consisting of the target extended code in the extended code set, and the second extended code subset is a subset consisting of an extended code in the extended code set which are not selected or selected by a plurality of second communication nodes.

For example, the first communication node transmits the indication information of the target extended code, so as to indicate extended codes contained in the first extended code subset, and each target extended code corresponds to a target subcarrier. For the second communication nodes without selection conflict of extended codes, each second communication node maps data onto a subcarrier corresponding to the selected extended code, the subcarriers used between different second communication nodes are different, and subcarrier data of each second communication node is transmitted by using OFDM.

Herein, the subcarrier data of the each second communication node being transmitted by using OFDM, includes one of the following two modes:

Mode 1: the second communication node transmits data after the data is tuned to a subcarrier frequency corresponding to a subcarrier index, and the following conditions are met: bandwidth of each subcarrier is equal, spacing between neighboring subcarriers is equal, and subcarrier bandwidth is equal to neighboring subcarrier spacing.

Mode 2: the second communication node modulates data to a subcarrier corresponding to a subcarrier index, and transmits after OFDM.

In this embodiment, the indication information of the target extended code may be a bit mapping (bitmap) of the extended code set, i.e., the extended codes in the extended code set correspond to G bits from a low bit to a high bit in sequence. In the bitmap, a bit value corresponding to an indicated extended code is 1, and a bit value corresponding to a non-indicated extended code is 0. For example, assuming that there are 16 extended codes, indices are 0 to 15, and correspond to 16 bits from a low bit to a high bit from small to large in sequence, and if the bitmap of the indication information of the target extended code is 0001 0100 1000 0011, then the indicated target extended code index is [0, 1, 7, 10, 12], and if the bitmap of the indication information of the extended code codebook is 1110 0000 1110 0000, then the indicated target extended code index is [5, 6, 7, 13, 14, 15].

In this embodiment, the extended code may extend data in frequency domain or may extend data in time domain. For a piece of to-be-transmitted data, after the extended code in frequency domain is adopted, transmission bandwidth of the extended data is increased to G times of the original transmission bandwidth, transmission duration remains unchanged, and the extended code in frequency domain implements parallel transmission of multiple labels through the spreading orthogonal code, without considering a guard period between sub-channels of the traditional frequency division multiplexing, which improves utilization efficiency of the spectrum, but cannot be used in a case where the bandwidth is limited. For a piece of to-be-transmitted data, after the extended code in time domain is adopted, transmission bandwidth of the extended data remains unchanged, transmission duration is increased to G times of the original transmission duration, and equivalently, the extended data is repeatedly transmitted in time domain, and the longer the extended code is, the higher the signal-to-noise ratio is, the better the coverage performance is, which is conducive to increasing the communication distance of the passive network. Herein, G is the length of the extended code.

A code division multiplexing based collision prevention method, applied to a second communication node, includes:

selecting an extended code from an extended code set;

extending a preamble sequence based on the extended code that is selected, so as to obtain an extended preamble sequence; and transmitting the extended preamble sequence.

In this embodiment, the extended code set includes a plurality of extended codes.

In this embodiment, the extended preamble sequence includes: an extended preamble sequence, obtained by each element of the preamble sequence P being multiplied by the extended code K, i.e., $P^{\otimes}K$; or, an extended preamble sequence, obtained by the preamble sequence P being multiplied by each element of the extended code K, i.e., $K^{\otimes}P$. Herein, $\otimes$ denotes kronecker product.

In this embodiment, the second communication node transmits an extended preamble sequence based on the selected extended code; the first communication node, after receiving the extended preamble sequence, transmits indication information of a target extended code to the second communication node; the second communication node receives the indication information of the target extended code, where the indication information of the target extended code indicates a first extended code subset or a second extended code subset.

Herein, the first extended code subset is a subset consisting of an extended code which is selected by a single second communication node in the extended code set, and the second extended code subset is a subset consisting of an extended code in the extended code set which is not selected, or which is selected by a plurality of second communication nodes.

If the extended code selected by the second communication node belongs to the second extended code subset, i.e., a plurality of second communication nodes select the extended code, then these second communication nodes will transmit data information based on the same extended code, which can not achieve the effect of code division multiplexing, and data transmitted between different second communication nodes is not the same, so the first communication node can not detect the data information of these second communication nodes. In order to solve this problem of selection conflict of extended codes, this embodiment provides four solutions as shown below, applied to the second communication node:

Solution 1

All the second communication nodes are enabled to select different extended codes, and transmit uplink data in parallel based on code division multiplexing.

In this embodiment, in a case where the extended code that is selected belongs to the second extended code subset, an extended code is re-selected from the second extended code subset, return to perform the operation of extending the preamble sequence based on the extended code that is selected, until the extended code that is selected belongs to the first extended code subset, i.e., until the extended code selected by the second communication node is not the same as extended codes selected by other second communication nodes.

In this embodiment, in a case where the extended code that is selected belongs to the second extended code subset, then the second communication node extends to-be-transmitted data based on the extended code that is selected, so as to obtain extended data. Extending the to-be-transmitted data based on the extended code that is selected, includes: multiplying each data of a to-be-transmitted data sequence S by an extended code K to obtain the extended data, i.e., $S^{\otimes}K$; or, multiplying a to-be-transmitted data sequence S by each element of an extended code K to obtain the extended data, i.e., $K^{\otimes}S$. Herein, $\otimes$ denotes kronecker product.

In this embodiment, the second communication node, after receiving a command C, transmits the extended data.

Solution 2

The second communication nodes without selection conflict of extended codes are enabled to transmit uplink data in parallel based on code division multiplexing.

In this embodiment, in a case where the extended code that is selected belongs to the first extended code subset, the data is extended based on the extended code that is selected to obtain extended data; and the extended data is transmitted.

Herein, extending the to-be-transmitted data based on the extended code that is selected, includes: multiplying each data of a to-be-transmitted data sequence S by an extended code K to obtain the extended data, i.e., $S^\otimes K$; or, multiplying a to-be-transmitted data sequence S by each element of an extended code K to obtain the extended data, i.e., $K^\otimes S$. Herein, $\otimes$ denotes kronecker product.

Solution 3

Each extended code in the first extended code subset corresponds to a slot. The second communication nodes without selection conflict of extended codes are enabled to transmit data information based on a slot value corresponding to the selected extended code, so as to achieve the purpose of time division multiplexing.

In this embodiment, a corresponding slot is determined based on an index of the selected extended code, and data is transmitted based on the slot. For example, in a case where the selected extended code belongs to the first extended code subset, the second communication node determines a corresponding slot value based on an index of the selected extended code, and transmits uplink data based on the slot value.

Herein, transmitting the uplink data based on the slot value, includes: in a case where the slot value is S, transmitting the data when a slot counter of the second communication node is increased to S; or, in a case where the slot value is S, transmitting the data when a slot counter of the second communication node is decreased from S to 0.

Solution 4

Each extended code in the first extended code subset corresponds to a subcarrier. The second communication nodes without selection conflict of extended codes map the data to a subcarrier corresponding to the extended code that is selected, so as to achieve the purpose of orthogonal frequency division multiplexing.

In this embodiment, a corresponding subcarrier is determined according to an index of the selected extended code, data is mapped onto the subcarrier and transmitted. For example, in a case where the selected extended code belongs to the first extended code subset, the second communication node determines a corresponding subcarrier according to an index of the extended code that is selected, maps the data onto the corresponding subcarrier and transmits the data.

Herein, mapping the data onto the subcarrier and transmitting the data, includes one of the following two modes:

Mode 1: the second communication node transmits the data after the data is tuned to a subcarrier frequency corresponding to a subcarrier index, and the following conditions are met: bandwidth of each subcarrier is equal, spacing between neighboring subcarriers is equal, and subcarrier bandwidth is equal to neighboring subcarrier spacing;

Mode 2: the second communication node modulates data to a subcarrier corresponding to a subcarrier index, and transmits the data after OFDM.

In an exemplary implementation, the present disclosure provides an information transmission apparatus. FIG. 3 is a structural schematic diagram of an information transmission apparatus provided by the embodiments of the present disclosure, the apparatus is configured for a first communication node, and the apparatus includes:

a receiving module 31, configured to receive an extended preamble sequence based on a selected extended code and transmitted by a second communication node;

a determining module 32, configured to determine a target extended code based on the extended preamble sequence, where the target extended code is an extended code selected by a single second communication node in an extended code set; and a transmitting module 33, configured to transmit indication information of the target extended code.

The information transmission apparatus provided in this embodiment is configured to implement the information transmission method of the embodiment as shown in FIG. 1, the implementing principle and technical effect of the information transmission apparatus provided in this embodiment are similar to those of the information transmission method of the embodiment as shown in FIG. 1, which will not be repeated herein.

Based on the above embodiments, variant embodiments of the above embodiments are proposed, and it should be noted herein that, in order to make the description brief, only differences from the above embodiments are described in the variant embodiment.

In an embodiment, the determination of a number of the second communication nodes, includes:

receiving a preamble sequence transmitted by the second communication nodes; and determining the number of the second communication nodes that simultaneously transmit the preamble sequence, according to received power of the preamble sequences.

In an embodiment, the determining module 32 indicating each of the second communication nodes to select an extended code from the G extended codes, including:

determining a number G of the extended codes according to the number of the second communication nodes, where G is greater than or equal to the number of the second communication nodes; and transmitting indication information of the G extended codes, where the indication information of the G extended codes indicates the number G of the extended codes or a length of the extended codes.

In an embodiment, the determining module 32 determining the target extended code based on the extended preamble sequence, includes:

de-extending the extended preamble sequence with an extended code in the extended code set; and determining the target extended code according to power of a de-extended preamble sequence.

In an embodiment, the indication information of the target extended code indicates one or more of:

a first extended code subset, and a second extended code subset;

where the first extended code subset is a subset consisting of the target extended code in the extended code set, and the second extended code subset is a subset consisting of an extended code in the extended code set which is not selected, or which is selected by a plurality of second communication nodes.

In an embodiment, the indication information of the target extended code indirectly indicates that a second communicating node selecting the second extended code subset re-selects an extended code from the second extended code subset.

In an embodiment, the apparatus further includes: an indication transmitting module, configured to:

indicate the second communication node to transmit data extended based on the selected extended code.

In an embodiment, the apparatus further includes: an extended data receiving module, configured to:

receive data extended based on the selected target extended code and transmitted by the second communication node.

In an embodiment, the apparatus further includes: a first data receiving module, configured to:

receive data according to a target slot, where the target slot is a slot corresponding to the target extended code.

In an embodiment, the apparatus further includes: a second data receiving module, configured to:

acquire data according to a target subcarrier, where the target subcarrier is a subcarrier corresponding to the target extended code.

Figure 4:
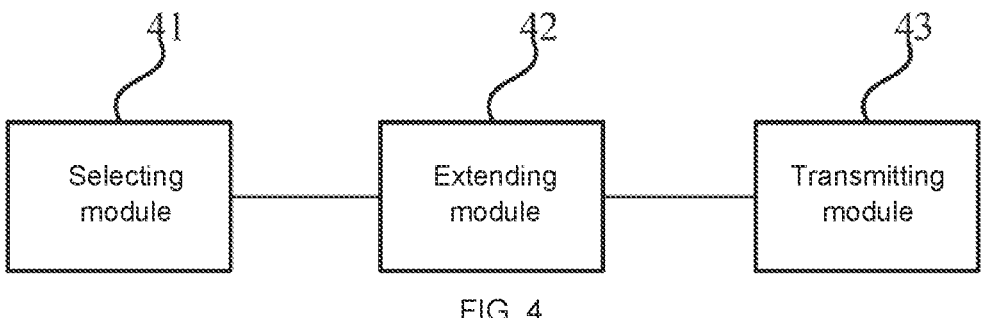
FIG. 4 shows a structural schematic diagram of another information transmission apparatus provided by the embodiments of the present disclosure.

In an exemplary implementation, the present disclosure provides an information transmission apparatus. FIG. 4 is a structural schematic diagram of another information transmission apparatus provided by the embodiments of the present disclosure, the apparatus is configured for a second communication node. As shown in FIG. 4, the apparatus includes:

a selecting module 41, configured to select an extended code from an extended code set;

an extending module 42, configured to extend a preamble sequence based on the extended code that is selected, so as to obtain an extended preamble sequence; and a transmitting module 43, configured to transmit the extended preamble sequence.

The information transmission apparatus provided in this embodiment is configured to implement the information transmission method of the embodiment as shown in FIG. 2. The implementing principle and technical effect of the information transmission apparatus provided in this embodiment are similar to those of the information transmission method of the embodiment as shown in FIG. 2, which will not be repeated herein.

Based on the above embodiments, variant embodiments of the above embodiments are proposed, and it should be noted herein that, in order to make the description brief, only differences from the above embodiments are described in the variant embodiment.

In an embodiment, the apparatus further includes: a receiving module, configured to:

receive indication information of a target extended code, where the indication information of the target extended code indicates a first extended code subset or a second extended code subset;

where the first extended code subset is a subset consisting of an extended code which is selected by a single second communication node in the extended code set, and the second extended code subset is a subset in the extended code set consisting of an extended code which is not selected, or which is selected by a plurality of second communication nodes.

In an embodiment, the apparatus further includes: a re-selecting module, configured to:

in a case where the extended code that is selected belongs to a second extended code subset, re-select an extended code from the second extended code subset, and return to perform an operation of extending the preamble sequence based on the extended code that is selected, until the extended code that is selected belongs to the first extended code subset.

In an embodiment, the apparatus further includes: a data extending module, configured to:

in a case where the extended code that is selected belongs to a first extended code subset, extend data based on the extended code that is selected, so as to obtain extended data; and transmit the extended data.

In an embodiment, the apparatus further includes: a first data transmitting module, configured to:

determine a corresponding slot according to an index of the selected extended code; and transmit data based on the slot.

In an embodiment, the apparatus further includes: a second data transmitting module, configured to:

determine a corresponding subcarrier according to an index of the selected extended code;

map data onto the subcarrier and transmit the data.

Figure 5:
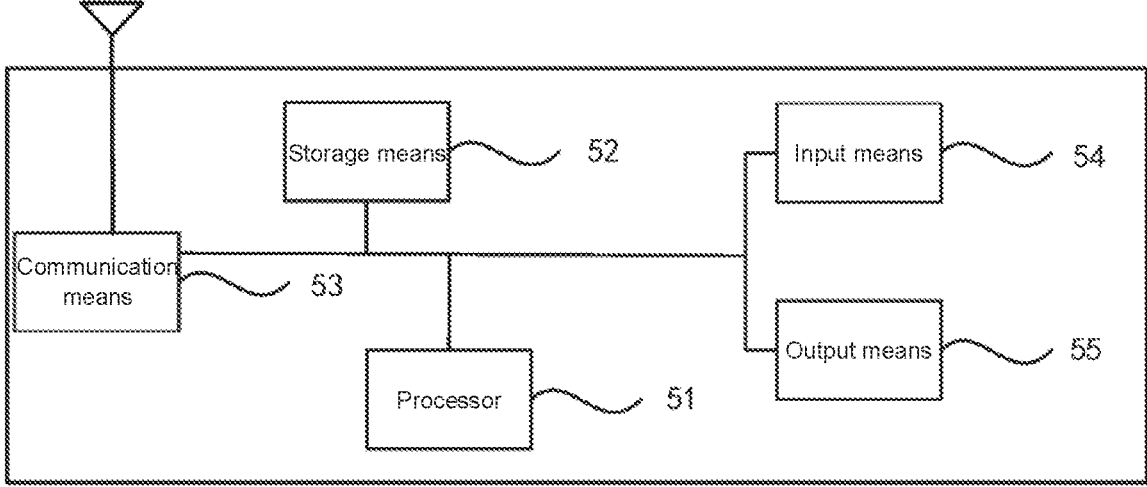
FIG. 5 is a structural schematic diagram of a first communication node provided by the embodiments of the present disclosure.

In an exemplary implementation, the embodiments of the present disclosure provide a first communication node. FIG. 5 is a structural schematic diagram of a first communication node provided by the embodiments of the present disclosure. As shown in FIG. 5, the first communication node provided by the present disclosure includes one or more processors 51 and a storage means 52; the processors 51 in the first communication node may be one or more, one processor 51 is taken as an example in FIG. 5; the storage means 52 is configured to store one or more programs; and the one or more programs are executed by the one or more processors 51, such that the one or more processors 51 implement the information transmission methods as described in any one of the embodiments of the present disclosure.

The first communication node further includes: a communication means 53, an input means 54 and an output means 55.

The processor 51, the storage means 52, the communication means 53, the input means 54, and the output means 55 in the first communication node may be connected by a bus or other ways, and connection by the bus is taken as an example in FIG. 5.

The input means 54 may be configured to receive input number or character information, and generate key signal input related to a user setting and a function control of the first communication node. The output means 55 may include a display means such as a display screen, etc.

The communication means 53 may include a receiver and a transmitter. The communication means 53 is configured to communicate information according to the control of the processor 51. The information includes, but is not limited to, the extended preamble sequence and the indication information of the target extended code, etc.

The storage means 52, as a computer-readable storage medium, may be configured to store a software program, a computer-executable program, and a module, such as a program instruction/module (e.g., the receiving module 31, the determining module 32, and the transmitting module 33 in the information transmission apparatus) corresponding to the information transmission methods as described in the embodiments of the present disclosure. The storage means 52 may include a storage program area and a storage data area, where the storage program area may store an operating system, an application program required for at least one function; and the storage data area may store data created according to the usage of the service node, and so on. Additionally, the storage means 52 may include a high speed random access memory, and may also include a non-volatile memory, such as at least one magnetic disk storage device, a flash memory device, or other non-volatile solid state storage device. In some examples, the storage means 52 may include memories disposed remotely relative to the processor 51, and these remote memories may be connected to the first communication node by a network. Examples of the above network include, but are not limited to, the Internet, an intranet, a local area network, a mobile communication network and combinations thereof.

Figure 6:
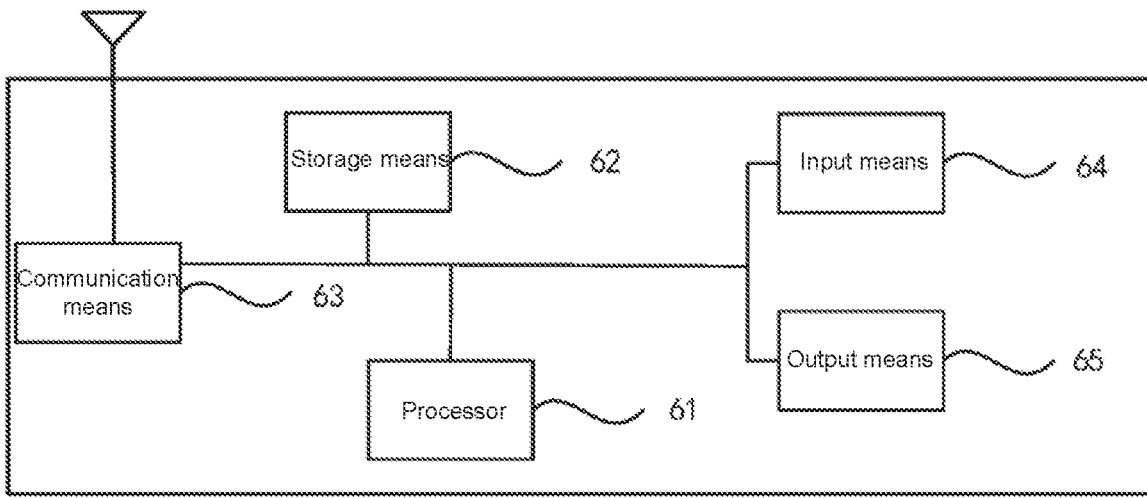
FIG. 6 is a structural schematic diagram of a second communication node provided by the embodiments of the present disclosure.

In an exemplary implementation, the embodiments of the present disclosure provide a second communication node. FIG. 6 is a structural schematic diagram of a second communication node provided by the embodiments of the present disclosure. As shown in FIG. 6, the second communication node provided by the present disclosure includes one or more processors 61 and a storage means 62; the processors 61 in the second communication node may be one or more, and one processor is taken as an example in FIG. 6; the storage means 62 is configured to store one or more programs; the one or more programs are executed by the one or more processors 61, such that the one or more processors 61 implement the information transmission methods as described in the embodiments of the present disclosure.

The second communication node further includes: a communication means 63, an input means 64 and an output means 65.

The processor 61, the storage means 62, the communication means 63, the input means 64, and the output means 65 in the second communication node may be connected by a bus or other ways, and connection by the bus is taken as an example in FIG. 6.

The input means 64 may be configured to receive input number or character information, and generate a key signal input related to a user setting and a function control. The output means 65 may include a display means such as a display screen, etc.

The communication means 63 may include a receiver and a transmitter. The communication means 63 is configured to communicate information according to the control of the processor 61. The information includes, but is not limited to, the extended preamble sequence.

The storage means 62, as a computer-readable storage medium, may be configured to store a software program, a computer-executable program, and a module, such as a program instruction/module (e.g., the selecting module 41, the extending module 42, and the transmitting module 43 in the information transmission apparatus) corresponding to the information transmission methods as described in the embodiments of the present disclosure. The storage means 62 may include a storage program area and a storage data area, where the storage program area may store an operating system, an application program required for at least one function; and the storage data area may store data created according to the usage of the second communication node, and so on. Additionally, the storage means 62 may include a high speed random access memory, and may also include a non-volatile memory, such as at least one magnetic disk storage device, a flash memory device, or other non-volatile solid state storage device. In some examples, the storage means 62 may include memories disposed remotely relative to the processor 61, and these remote memories may be connected to the second communication node by a network. Examples of the above networks include, but are not limited to, the Internet, an intranet, a local area network, a mobile communication network and combinations thereof.

The embodiments of the present disclosure further provide a storage medium, storing a computer program thereon, the computer program, upon being executed by a processor, implements any of the methods described in the present disclosure. The storage medium stores a computer program, the computer program, upon being executed by a processor, implements any one of the information transmission methods in the embodiments of the present disclosure. For example, the information transmission method applied to a first communication node, includes:

receiving an extended preamble sequence based on a selected extended code and transmitted by a second communication node;

determining a target extended code based on the extended preamble sequence, where the target extended code is an extended code selected by a single second communication node in an extended code set; and transmitting indication information of the target extended code.

The information transmission method applied to a second communication node includes:

selecting an extended code from an extended code set;

extending a preamble sequence based on the extended code that is selected, so as to obtain an extended preamble sequence; and transmitting the extended preamble sequence.

The computer storage medium of the embodiments of the present disclosure may adopt any combination of one or more computer-readable media. The computer-readable medium may be a computer-readable signal medium or a computer-readable storage medium. A computer-readable storage medium may be, for example, but not limited to, an electrical, magnetic, optical, electromagnetic, infrared, or semiconductor system, apparatus or means, or any combination thereof. More specific examples (a non-exhaustive list) of a computer-readable storage medium include: an electrical connection with one or more wires, a portable computer magnetic disk, a hard disk, a random access memory (RAM), a read-only memory (ROM), an erasable programmable read-only memory (EPROM), a flash memory, an optical fiber, a portable CD-ROM, an optical storage means, a magnetic storage means, or any suitable combination of the above. A computer-readable storage medium may be any tangible medium that contains or stores a program which is used by or in combination with, an instruction executing system, apparatus, or means.

A computer-readable signal medium may include a data signal, which is propagated in a baseband or as a part of a carrier wave, and in which a computer-readable program code is carried. Such a propagated data signal may have many forms, including but not limited to: an electromagnetic signal, an optical signal, or any suitable combination of the above. A computer-readable signal medium may also be any computer-readable medium other than the computer-readable storage medium, and the computer-readable medium may send, propagate, or transmit the program which is used by or in combination with the instruction executing system, apparatus, or means.

A program code contained on the computer-readable medium may be transmitted using any appropriate medium, including but not limited to: wireless, wire, optical cable, radio frequency (RF), etc., or any suitable combination of the above.

The computer program code for performing operations of the present disclosure may be written in one or more programming languages, or a combination thereof, including an object-oriented programming language-such as Java, Smalltalk, C++, and also including conventional procedural programming language-such as "C" language or a similar programming language. The program code may be executed entirely on a user's computer, partly on the user's computer, as a stand-alone software package, partly on the user's computer and partly on a remote computer, or entirely on the remote computer or a server. In a case where the remote computer is involved, the remote computer may be connected to the user's computer by any kind of network, including a local area network (LAN) or a wide area network (WAN), or may be connected to an external computer (e.g., connected by the Internet using an Internet service provider).

The foregoing is only the exemplary embodiments of the present disclosure and is not used to limit the scope of protection of the present disclosure.

Those skilled in the art should understand that, the term terminal device or terminal covers any suitable type of wireless user equipment, for example, a mobile phone, a portable data processing apparatus, a portable web browser or a vehicle-mounted mobile station.

In general, many embodiments of the present disclosure may be implemented in a hardware or an application specific circuit, a software, a logic or any combination thereof. For example, in some aspects, the embodiments may be implemented in the hardware, and in other aspects, the embodiments may be implemented in the hardware or the software which may be executed by a controller, a microprocessor or other computing apparatuses, although the present disclosure is not limited herein.

The embodiments of the present disclosure may be implemented by a data processor of a mobile apparatus (e.g., in a processor entity, or by the hardware, or by a combination of the software and the hardware) executing the computer program instruction. The computer program instructions may be assembly instructions, instruction set architecture (ISA) instructions, machine instructions, machine-related instructions, microcodes, firmware instructions, state setting data, or source codes or object codes written in any combination of one or more programming languages.

The block schematic diagrams of any logic flow in the drawings of the present disclosure may represent program steps, or may represent the interconnected logic circuits, modules, and functions, or may represent a combination of program steps, and logic circuits, modules and functions. The computer program may be stored on the memory. The memory may be of any type suitable for the local technical environment and may be implemented by using any suitable data storage technology, for example, but is not limited to, a read-only memory (ROM), a random access memory (RAM), or an optical memory apparatus and system (Digital Video Disc (DVD) or Compact Disk (CD)), etc. The computer-readable medium may include a non-transitory storage medium. The data processor may be of any type suitable for the local technical environment, for example, but not limited to, a general purpose computer, an application specific computer, a microprocessor, a digital signal processor (DSP), an application specific integrated circuit (ASIC), a field-programmable gate array (FPGA[[FGPA]]), and a processor based on a multi-core processor architecture.

The information transmission method provided by the embodiments of the present disclosure determines a target extended code, and then transmits indication information of the target extended code, so as to avoid the situation of conflict of uplink signals.

What is claimed is:
1. An information transmission method, applied to a first communication node, the method comprising:
    receiving an extended preamble sequence based on a selected extended code and transmitted by a second communication node;
    determining a target extended code based on the extended preamble sequence, wherein the target extended code is an extended code selected by a single second communication node in an extended code set; and transmitting indication information of the target extended code; wherein
the extended preamble sequence includes: an extended preamble sequence, obtained by each element of a preamble sequence being multiplied by the selected extended code; or, an extended preamble sequence, obtained by a preamble sequence being multiplied by each element of the selected extended code.

2. The method according to claim 1, wherein the determining the target extended code based on the extended preamble sequence, comprises:
    de-extending the extended preamble sequence with an extended code in the extended code set; and
    determining the target extended code according to power of a de-extended preamble sequence.

3. The method according to claim 1, wherein the indication information of the target extended code indicates at least one of:
    a first extended code subset, and a second extended code subset;
    wherein the first extended code subset is a subset consisting of the target extended code in the extended code set, and the second extended code subset is a subset consisting of an extended code in the extended code set which is not selected, or which is selected by a plurality of second communication nodes.

4. The method according to claim 3, wherein the indication information of the target extended code indirectly indicates that a second communicating node selecting the second extended code subset re-selects an extended code from the second extended code subset.

5. The method according to claim 1, further comprising:
    indicating the second communication node to transmit data extended based on the selected extended code.

6. The method according to claim 1, further comprising:
    receiving data extended based on the target extended code that is selected and transmitted by the second communication node.

7. The method according to claim 1, further comprising:
    receiving data according to a target slot, wherein the target slot is a slot corresponding to the target extended code.

8. The method according to claim 1, further comprising:
    acquiring data according to a target subcarrier, wherein the target subcarrier is a subcarrier corresponding to the target extended code.

9. A non-transitory storage medium, wherein the non-transitory storage medium stores a computer program, the computer program, upon being executed by a processor, implements the method according to claim 1.

10. An information transmission method, applied to a second communication node, the method comprising:
    selecting an extended code from an extended code set;
    extending a preamble sequence based on the extended code that is selected, so as to obtain an extended preamble sequence; and
    transmitting the extended preamble sequence; wherein
    the extended preamble sequence includes: an extended preamble sequence, obtained by each element of the preamble sequence being multiplied by the extended code that is selected; or, an extended preamble sequence, obtained by the preamble sequence being multiplied by each element of the extended code that is selected.

11. The method according to claim 10, further comprising:
    receiving indication information of a target extended code, wherein the indication information of the target extended code indicates at least one of a first extended code subset and a second extended code subset;

wherein the first extended code subset is a subset consisting of an extended code in the extended code set which is selected by a single second communication node, and the second extended code subset is a subset consisting of an extended code in the extended code set which is not selected, or which is selected by a plurality of second communication nodes.

12. The method according to claim 10, further comprising:

in a case where the extended code that is selected belongs to a second extended code subset, re-selecting an extended code from the second extended code subset, and returning to perform an operation of extending the preamble sequence based on the extended code that is selected, until the extended code that is selected belongs to a first extended code subset.

13. The method according to claim 10, further comprising:

in response to determining that the extended code that is selected belongs to a first extended code subset, extending data based on the extended code that is selected, so as to obtain extended data; and transmitting the extended data.

14. The method according to claim 10, further comprising:

determining a corresponding slot according to an index of the extended code that is selected; and transmitting data according to the slot.

15. The method according to claim 10, further comprising:

determining a corresponding subcarrier according to an index of the extended code that is selected;

mapping data onto the subcarrier and transmitting the data.

16. A second communication node, comprising:

one or more processors;

a storage means, configured to store one or more programs;

when the one or more programs are executed by the one or more processors, such that the one or more processors implement the method according to claim 10.

17. The method according to claim 11, further comprising:

in a case where the extended code that is selected belongs to a second extended code subset, re-selecting an extended code from the second extended code subset, and returning to perform an operation of extending the preamble sequence based on the extended code that is selected, until the extended code that is selected belongs to a first extended code subset.

18. The method according to claim 11, further comprising:

in response to determining that the extended code that is selected belongs to a first extended code subset, extending data based on the extended code that is selected, so as to obtain extended data; and transmitting the extended data.

19. The method according to claim 11, further comprising:

determining a corresponding slot according to an index of the extended code that is selected, and transmitting data according to the slot; or determining a corresponding subcarrier according to an index of the extended code that is selected, and mapping data onto the subcarrier and transmitting the data.

20. A first communication node, comprising:

one or more processors;

a storage means, configured to store one or more programs;

when the one or more programs are executed by the one or more processors, such that the one or more processors implement steps of:

receiving an extended preamble sequence based on a selected extended code and transmitted by a second communication node;

determining a target extended code based on the extended preamble sequence, wherein the target extended code is an extended code selected by a single second communication node in an extended code set; and transmitting indication information of the target extended code; wherein the extended preamble sequence includes: an extended preamble sequence, obtained by each element of a preamble sequence being multiplied by the selected extended code; or, an extended preamble sequence, obtained by a preamble sequence being multiplied by each element of the selected extended code.

* * * * *